United States Patent [19]

McGehee

[11] Patent Number: 4,598,916
[45] Date of Patent: Jul. 8, 1986

[54] MAGNETIC SAW CHUCK

[75] Inventor: John McGehee, Ukiah, Calif.

[73] Assignee: Ukiah Machine & Welding Inc., Ukiah, Calif.

[21] Appl. No.: 678,721

[22] Filed: Dec. 6, 1984

[51] Int. Cl.$^4$ .......................... B23B 5/34; B23B 31/40
[52] U.S. Cl. ................................ 279/1 M; 279/2 R
[58] Field of Search ................. 279/1 M, 2 R; 269/8, 269/48.1; 82/44; 242/72 R

[56] References Cited

U.S. PATENT DOCUMENTS

| | | | |
|---|---|---|---|
| 2,738,980 | 3/1956 | Spahn | 279/2 |
| 2,775,025 | 12/1956 | Williams | 279/2 X |
| 3,320,564 | 5/1967 | Sosey et al. | 269/8 X |
| 3,360,276 | 12/1967 | Peffer | 279/2 |

Primary Examiner—Douglas D. Watts
Attorney, Agent, or Firm—Townsend and Townsend

[57] ABSTRACT

An improved magnetic saw chuck includes a disc-shaped magnetic saw chuck plate, having a saw engaging surface at which a number of magnets are mounted, and a cylindrical arbor extending from the plate. A three-segment ring, mounted over the arbor adjacent the saw engaging surface, has an outer, saw eye engaging surface over which the saw is mounted. The segmented ring has a tapered inner surface which engages the tapered outer surface of a jam nut which is threaded onto the arbor. Tightening the jam nut against the segmented ring separates the segments to center the saw. The segmented ring includes an O-ring within a circular groove in the ring to keep the segments secured to the arbor when a saw is not mounted to the chuck. To prevent relative rotary motion of the ring segments, so the segments move only radially to aid centering the saw on the chuck, a guide pin is mounted to and extends from each segment and engages a complementary radial guide slot in the chuck plate.

3 Claims, 3 Drawing Figures

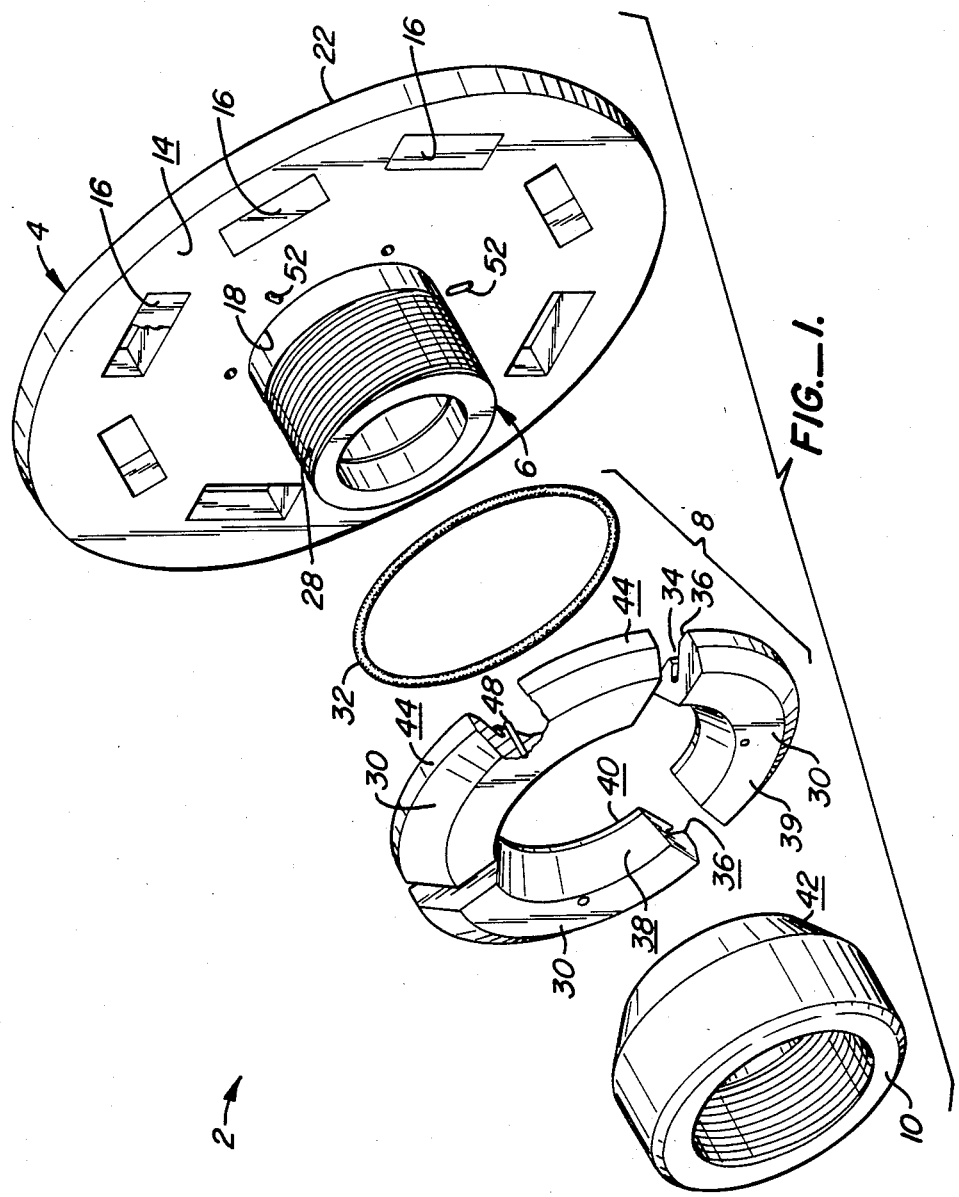
FIG._1.

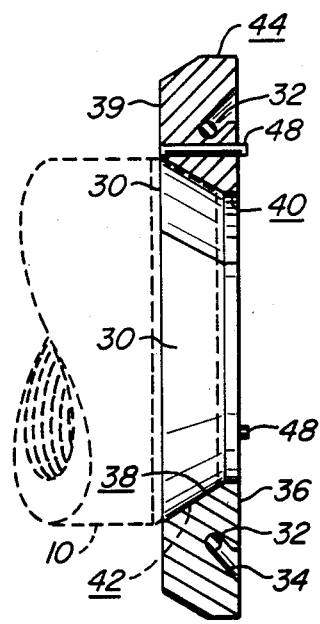
FIG._2.
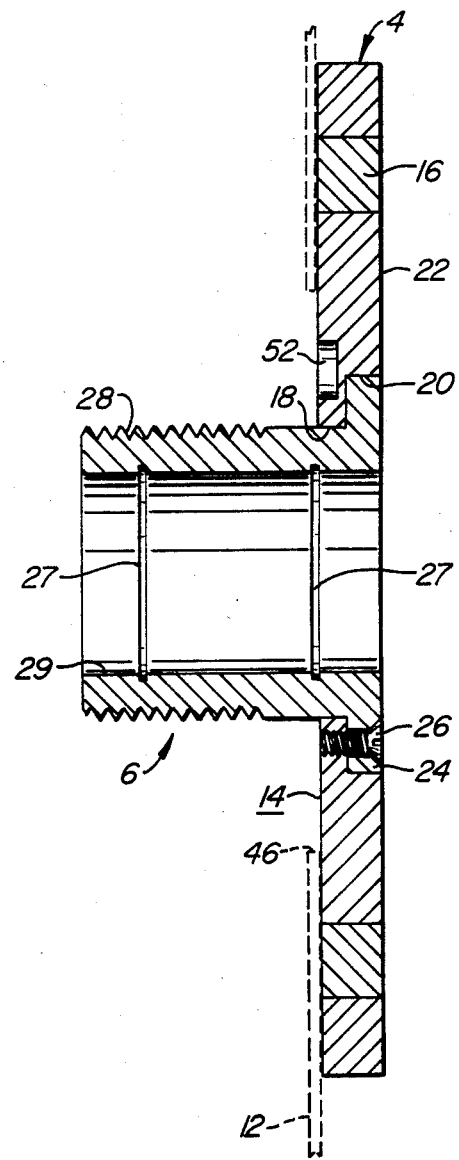
FIG._3.

MAGNETIC SAW CHUCK

BACKGROUND OF THE INVENTION

A saw chuck is used to hold a circular saw blade concentric with its centerline for grinding, tipping, swaging and gumming. The very early saw chucks were simply cone-shaped plugs going through the center or eye of the saw. This method of holding the saw is still widely used. One disadvantage in this method is that each time you remove the saw, you must first remove the cone. Another disadvantage of this cone-type centering device is that it offers no means of stabilizing the saw blade out away from the eye.

In the early 1970's the present inventor devised an improved method of chucking the saw for grinding. This commercially available saw chuck uses a solid steel plate with a shoulder machined on it for the eye of the saw. The plate has magnets imbedded in it to hold the saw plate flat and tight against the saw abutting face of the chuck. The use of the magnets tends to stabilize the saw and reduce vibration of the grinding wheel sharpening the saw. This method works well until the saw eye gets worn and no longer fits closely over the shoulder. When this occurs, the saw no longer is held concentric with the axis of rotation and therefore will not grind true.

In response to this, the present inventor came up with an improved magnetic saw chuck using a radially expanding segmented ring to center the eye of the saw on the chuck face. With this commercially available saw chuck, the segmented ring is made in three pieces and is held together with a steel spring clip. The segmented ring is mounted over a threaded arbor. A jam nut having a tapered forward face is tightened against the correspondingly tapered surfaces of the ring segments so that the ring segments expand against the saw eye to center the saw. Although this improved magnetic saw chuck is a marked improvement over the earlier saw chucks, moderate off-center chucking of the saw can still occur.

SUMMARY OF THE INVENTION

The present invention is directed to an improved magnetic saw chuck and includes a disc-shaped magnetic saw chuck plate having a saw engaging surface within which a number of magnets are mounted. A generally cylindrical arbor extends from the saw engaging surface and is positioned coaxially with the axis of rotation of the plate. A segmented split ring clamp, typically having three segments, is mounted over the arbor adjacent the saw engaging surface. The split ring clamp has an outer, saw eye engaging surface formed by the outer surfaces of the segments. The split ring clamp segments have tapered inner surfaces which engage the complementarily tapered outer surface of a jam nut. The jam nut is typically secured onto the arbor with threads. Tightening the jam nut against the split ring clamp forces the segments raidally outwardly a short distance to bias the split ring clamp segments against the saw eye to lock the saw in position.

The split ring clamp also includes an O-ring which fits within a circular groove in the segmented clamp, the groove tapering axially and radially inwardly, to keep the sections mounted to the arbor when a saw is not mounted to the chuck.

To inhibit relative rotary motion of the split ring clamp segments, the segments and the magnetic chuck plate are configured to ensure the segments move only radially. Preferably each segment carries a guide pin extending from the segment towards the saw engaging surface of the magnetic chuck plate. The magnetic chuck plate has complementary radially extending guide slots for receipt of the guide pins. The interaction of the guide pins and slots eliminates relative rotary motion of the segments. This reduces the off-center clamping of the saw to a fraction of what it would be without such guide pins and guide slots.

A primary advantage of the present invention is that it substantially reduces the off-center mounting of the saw compared with prior art magnetic saw chucks using a segmented split ring clamp. Although the split ring clamp segments of the prior art magnetic chucks move radially outwardly under the influence of the jam nut, the present inventor discovered that the segments could also undergo a rotary motion shift relative to one another. That is, the angular distance between the centers of the segments could change, thus causing off-center chucking of the saw. To counteract this, the invention provides, in a preferred embodiment, split ring clamp segments with guide pins for movement along radially directed guide slots in the chuck plate; this eliminates the relative rotary motion which can otherwise occur. It has been found that runout can be reduced from 0.015 inch, for the formerly used segmented clamp magnetic saw chucks, to only 0.003 inch with a saw chuck made according to the present invention and used under similar circumstances.

Another feature of applicant's invention is the use of a separate chuck plate and a separate arbor bolted to one another. This is important since magnetic chuck plates of different diameters can be stocked for mounting to the same size arbor. Thus inventory requirements are reduced. Since the outside diameter of the arbor is the same for a range of saw sizes, different saw eye sizes are accommodated by stocking split ring clamps having different outside diameters. This reduces inventory cost for both the manufacturer and the user. The same chuck plate and arbor can be used for a variety of saws having differing saw eye diameters, primarily changing the segmented split ring clamp used.

Other features and advantages of the present invention will appear from the following description in which the preferred embodiment has been set forth in detail in conjunction with the accompanying drawings.

DETAILED DESCRIPTION OF THE DRAWINGS

FIG. 1 is an exploded isometric view of the magnetic saw chuck of the invention.

FIG. 2 is a side cross-sectional view of the split ring clamp of FIG. 1 showing a portion of the jam nut in dashed lines.

FIG. 3 is a side cross-sectional view of the magnetic saw chuck plate and arbor of FIG. 1.

DETAILED DESCRIPTION OF THE PREFERRED EMBODIMENT

Referring now to the figures, a magnetic saw chuck 2 is shown to include broadly a disc-shaped magnetic saw chuck plate 4 to which is mounted generally cylindrical arbor 6. A segmented split ring clamp 8 and a jam nut 10 are mounted over arbor 6. A saw 12 (see FIG. 3) is mounted adjacent the saw engaging surface 14 of plate 4 and held against it by a number of magnets 16 imbedded in plate 4.

Plate 4 has a central opening 18 which includes a counter-sunk portion 20 at the rear face 22 of plate 4. Arbor 6 includes a circular lip 24 at one end sized to fit within counter-sunk portion 20. Chuck plate 4 and arbor 6 are secured to one another by a number of screws 26 passing through lip 24 and into plate 4. In this way, a single sized arbor can be mounted to a variety of sizes of plates 4 according to the size of the saw to be mounted to chuck 2. Arbor 6 has a threaded end 28 for receipt of threaded jam nut 10. A pair of grooves 27 are formed in bore 29 of arbor 6 for positioning bearings, not shown.

Segmented clamp 8 includes three arcuate segments 30 forming a segmented ring-like structure sized to fit over arbor 6. Clamp 8 also includes a rubber O-ring 32 mounted within an axially and radially inwardly extending groove 34 formed in the plate opposing face 36 of clamp 8. Clamp 8 has an inwardly tapering conical surface 38 extending from the forward face 39 of clamp 8 to a generally cylindrical arbor abutting surface 40. Surface 38 is an internally tapered surface and is engaged by a tapered conical outer surface 42 of jam nut 10. Surfaces 38 and 42 are complementary so that forcing jam nut 10 against clamp 8, by threading jam nut 10 along threaded end 28 of arbor 6, tends to separate segments 30 forcing the outer, saw eye engaging generally cylindrical surface 44 of split ring clamp 8 against the saw eye 46 of saw 12. Thus, even when saw eye 46 becomes worn and a bit oversized, it is securely positioned on chuck 2 by the radially movable segments 30.

To ensure that segments 30 do not shift when tightened against saw eye 46, a guide pin 48 is mounted to each segment 30 to extend from plate opposing face 36 of clamp 8. To accommodate guide pins 48, three radially extending guide slots 52 are formed in surface 14 of plate 4 for receipt of pins 48. The provision of pins 48 and slots 52 ensures that as segments 30 are biased radially outwardly by jam nut 10, segments 30 do not change their relative rotary positions. That is, the angular distances between pins 48 remains constant. Thus, pins 48 and slots 52 eliminate one of the primary causes of saw runout which can occur with magnetic saw chucks which lack these guide elements. Radial guide slots 52 are preferably straight with no rotary component. However, it is contemplated that slots 52 may be curved or angled in identical amounts so that movement of jam nut 10 against clamp 8 causes segments 30 to move with both radial and rotary components of movement; however, since the rotary component of movement of each segment 30 would be the same, no relative rotary movement of the segment would result, as is desired.

In use the user mounts a saw 12 to chuck 2 by inserting it over clamp 8 until it abuts magnetic chuck plate 4. Since the outside diameter of jam nut 10 is preferably less than the diameter of outer, saw eye engaging surface 44, there is no need to remove jam nut 10 when mounting or removing saws 12. Jam nut 10 is then grasped by the user and rotated to tighten it against clamp 8. Tapered surface 42 engages tapered surface 38 forcing segments 30 radially outwardly. Relative rotary motion between segments 30 is prevented by the guidance of pins 48 within slots 52. After saw 12 has been worked on, such as sharpened by grinding, saw 12 is removed from chuck 2 by backing jam nut 10 away from clamp 8 allowing segments 30 to move inwardly under the radially inwardly biasing force provided by O-ring 32. Saw 12 can then be removed by sliding it off clamp 8, over jam nut 10 and past the outer end of arbor 6.

Modification and variation can be made to the disclosed embodiment without departing from the subject of the invention as defiend in the following claims. For example, one could combine the function of arbor 6 and jam nut 10 by providing external threads at the end of a jam nut for mating engagement with internal threads formed in a central opening of a magnetic chuck plate. Also, it may be desired to use a pair of radially spaced guide pins 48 for each segment 30 to help eliminate any pivotal or rocking movement of segments 30.

I claim:

1. An improved magnetic saw chuck of the type having a magnetic chuck plate, an arbor, the plate and arbor having a common axis, a segmented ring positioned about the arbor and adjacent a saw engaging surface of the magnetic chuck plate, the segmented ring having a saw eye engaging outer surface and a tapered inner surface, and a jam nut threadably mounted to the arbor and having an outer tapered surface complementary with the inner tapered surface segments for forcing the split ring segments radially outwardly against the saw eye, wherein the improvement comprises:

means for preventing relative rotary movement of the radially expandable ring segments so the saw eye engaging outer surface remains concentric with the axis, said relative rotary movement preventing means including a pin and a radially extending pin guide surface for each of said split ring segments.

2. The improved saw chuck of claim 1 wherein said pins are mounted to the split ring segments and said pin guide surfaces define complementary pin slots in the chuck plate for receipt of said pins.

3. A magnetic saw chuck for use with a saw having a saw eye, comprising:

a disc-like magnetic saw plate having a magnetic saw engaging surface and an axis;

an arbor, having a threaded outer end, removably mounted to and extending from the saw engaging surface and positioned coaxial with said axis;

a saw centering segmented ring, including at least three segments, surrounding the arbor, said segmented ring including a front face toward the saw engaging surface, a rear face facing opposite the saw engaging surface and a outer surface connecting the front and rear faces, the outer surface sized for complementary mating engagement with the saw eye;

said segmented ring including a generally circular groove formed in the front faces of the segments and extending axially away from the front face and radially inwardly;

a resilient ring-like member mounted within the circular groove to bias the segments toward the arbor;

said rear face including a conical internal surface extending away from said rear face and radially inwardly;

a jam nut, mounted to the threaded outer end of the arbor, having a conical external surface opposite the conical internal surface and sized for complementary mating engagement with the conical internal surface so that advancing the jam nut towards the saw plate with the internal and external conical surfaces engaged drives the segments radially outwardly against the force of the resilient ring-like member so that the outer surface of the segmented ring engages the saw eye to center the saw on the arbor;
a guide pin extending from the front face of each of the segments; and
the saw plate having radially extending slots in the saw engaging surface for receipt of said guide pins to prevent relative rotary motion among the segments.

* * * * *